(12) United States Patent
Neukam

(10) Patent No.: US 10,658,009 B2
(45) Date of Patent: May 19, 2020

(54) COMPUTER SYSTEM AND COMPUTER CASING

(71) Applicant: Fujitsu Technology Solutions Intellectual Property GmbH, München (DE)

(72) Inventor: Wilhelm Neukam, München (DE)

(73) Assignee: Fujitsu Client Computing Limited, Kawasaki (JP)

( * ) Notice: Subject to any disclaimer, the term of this patent is extended or adjusted under 35 U.S.C. 154(b) by 0 days.

(21) Appl. No.: 15/631,450

(22) Filed: Jun. 23, 2017

(65) Prior Publication Data
US 2017/0372757 A1    Dec. 28, 2017

(30) Foreign Application Priority Data

Jun. 27, 2016    (DE) ........................ 10 2016 111 719

(51) Int. Cl.
*H05K 5/00*    (2006.01)
*G11B 33/12*    (2006.01)
*G06F 1/18*    (2006.01)

(52) U.S. Cl.
CPC ............ *G11B 33/127* (2013.01); *G06F 1/183* (2013.01); *G06F 1/184* (2013.01); *G06F 1/186* (2013.01); *G11B 33/12* (2013.01)

(58) Field of Classification Search
CPC ........................................................ G06F 1/16
See application file for complete search history.

(56) References Cited

U.S. PATENT DOCUMENTS

| 2008/0002355 | A1* | 1/2008 | Carnevali ............ G06F 1/1632 361/679.41 |
| 2016/0081218 | A1 | 3/2016 | Fietz et al. |

FOREIGN PATENT DOCUMENTS

| DE | 10 2006 009 215 B3 | 8/2007 |
| DE | 10 2009 043 656 B4 | 7/2011 |
| DE | 10 2013 105 173 A1 | 12/2014 |
| GB | 2 435 550 A | 8/2007 |

* cited by examiner

*Primary Examiner* — Jerry Wu
(74) *Attorney, Agent, or Firm* — DLA Piper LLP (US)

(57) ABSTRACT

A computer system includes a computer casing having a casing wall having an opening to pass through a connection means; a circuit board having the connection means; and a centering means arranged in the casing, wherein the centering means is formed to cooperate with the circuit board such that the circuit board is centered with respect to the casing wall in a direction of the casing wall in a placing movement so that the connection means takes a predetermined position flush with respect to the opening in the casing wall and can plunge into the opening.

7 Claims, 1 Drawing Sheet

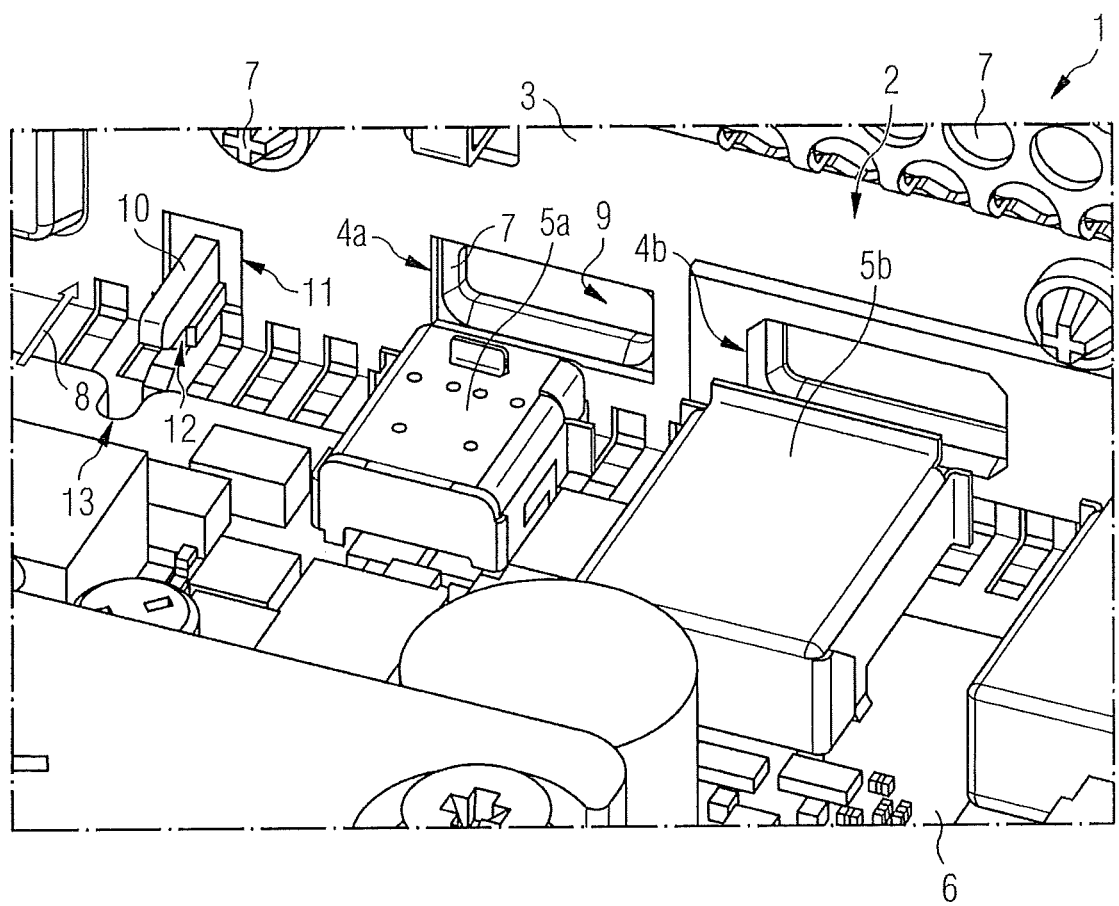

COMPUTER SYSTEM AND COMPUTER CASING

TECHNICAL FIELD

This disclosure relates to a computer system having a computer casing and also to such a computer casing.

BACKGROUND

Computer systems typically comprise a computer casing in which one or multiple components of the computer system are arranged. In particular, computer systems have a mainboard equipped with a plurality of electronic components and modules. Inter alia, connection means that can be contacted from outside the computer casing are provided on the mainboard.

When mounting mainboards, damage to the components or connection means may occur due to the filigree installation of the electronic components and connection means. This results in cost-expensive rejects, in particular when taking into account that computer systems are often mass-produced under enormous time and cost pressure.

It could therefore be helpful to provide a computer system as well as a computer casing for the computer system that contribute to a simplified and efficient mounting process.

SUMMARY

I provide a computer system including a computer casing having a casing wall having an opening to pass through a connection means; a circuit board having the connection means; and a centering means arranged in the casing, wherein the centering means is formed to cooperate with the circuit board such that the circuit board is centered with respect to the casing wall in a direction of the casing wall in a placing movement so that the connection means takes a predetermined position flush with respect to the opening in the casing wall and can plunge into the opening.

I also provide a computer casing for a computer system including a casing wall having an opening to pass through a connection means; and a centering means arranged in the computer casing and formed such that a circuit board arranged in the casing is centered in a direction towards the casing wall during a placing movement so that a connection means secured on the circuit board takes a predetermined position flush with the opening in the casing wall.

BRIEF DESCRIPTION OF THE DRAWING

FIG. 1 shows a perspective schematic partial view of a computer system when mounting a circuit board.

LIST OF REFERENCE CHARACTERS

1 Computer system
2 Computer casing
3 Casing wall
4a, 4b Opening
5a, 5b Connection means
6 Circuit board
7 Connection cover
8 Placing movement
9 Cover opening
10 Centering means
11 Further opening
12 Cut-out of the centering means
13 Cut-out of the circuit board

DETAILED DESCRIPTION

I provide a computer system comprising a computer casing having a casing wall. The casing wall has at least one opening to guide through a connection means. Furthermore, the computer system comprises a circuit board having the connection means. The computer system further comprises a centering means arranged in the casing. The centering means is formed to engage with the circuit board such that the circuit board is centered with respect to the casing wall during a placing movement in the direction of the casing wall so that the connection means takes a predetermined position in the casing wall and aligned with the opening and can plunge into the opening.

The computer system achieves that the circuit board having the connection means can be mounted in the computer casing in a simple, safe and efficient manner. A trouble-free mounting process is made possible. After placing the circuit board in the computer casing, e.g., on mounting bolts in the computer casing, the circuit board is moved, e.g., displaced, in the direction of the casing wall according to a first placing movement. By the centering means or centering element, the circuit board and thus the connection means secured thereto is pre-centered so that the connection means can plunge into the opening in a reliable and collision-free manner when continuing the placing movement. This pre-centering of the circuit board with respect to the casing wall particularly achieves that the connection means does not collide with the casing wall since the connection means is centered before contacting the casing wall or before plunging into the casing wall due to its fixed position on the circuit board.

Furthermore, pre-centering allows the opening in the casing wall to be adapted to the connection means in a particularly exact manner with respect to its shape. In other words, a particularly narrow circumferential clearance can be realized since a particularly short tolerance chain is realized due to the pre-centering via the centering means. In other words, the centering means enables an immediate, direct centering of the circuit board with respect to the casing wall and avoids further tolerances. Damage to the connection means, which typically is a filigree plug connection, is prevented despite narrow clearances.

The connection means is a peripheral port arranged directly on the circuit board. For example, a peripheral device can be connected from outside the computer system via the connection means. The connection means can also be referred to as a plug connector having a casing. Typically, the connection means is adapted according to a specification or a standard, e.g., USB, in terms of its outer dimensions and shapes. For example, the opening in the casing wall is formed such that only a slight circumferential clearance, e.g., of a few tenth of millimeters, is formed when the connection means is plunged into the opening. For example, this contributes to an EMC (electromagnetic compatibility) sealing. Especially in an exact and narrow adjustment of the opening to external dimensions of the connection means, the pre-centering is particularly advantageous so that the connection means can be inserted in the opening in a targeted manner and the circuit board can reach its intended mounting position.

Centering the circuit board means that the circuit board is centered in position in at least one direction with respect to the casing wall. However, it is also possible that the circuit board is centered in two directions. For example, the circuit board is centered with respect to a direction which runs perpendicular to the placing movement and parallel to a main extension plane of the circuit board. This direction can be referred to as lateral direction. A further direction is, e.g., a normal direction of the circuit board, i.e., a direction that runs perpendicular with respect to the main extension plane of the circuit board and parallel to the casing wall. In other words, the circuit board is centered with respect to directions spanning an extension plane of the casing wall, for example.

The centering means is provided in spatial proximity to the connection means or cooperates with the circuit board in spatial proximity to the connection means, for example. This contributes to an especially effective centering. For example, the centering means is a part of the casing wall, of a further casing wall of the computer casing or a part of a separate element.

The centering means may be configured as a guide pin. The guide pin can also be referred to as a guidance pin. Such a guide pin is easily manufactured and takes little space in a computer casing, for example.

The circuit board may comprise a cut-out that cooperates with the centering means for the centering during the placing movement. For example, the cut-out is adapted to a shape of the centering means. The cut-out is formed as a slot or as a pocket in the circuit board, for example. While centering in the placing movement, the cut-out receives the centering means in such a form-fit manner that centering is effected in one or two directions. In other words, a form-fit of the circuit board with the centering means is achieved via the cut-out. In particular, this achieves a lateral centering with respect to the casing wall, e.g., parallel to a main extension plane of the circuit board.

The centering means may comprise a cut-out that cooperates with the circuit board for the centering during the placing movement. The cut-out is adapted to a shape of the circuit board, for example. In particular, the cut-out is adapted to a thickness of the circuit board. The cut-out is formed as a slot, for example. Thus, the circuit board can be received in the cut-out of the centering means in a form-fit manner in the centering during the placing movement. This can achieve a centering of the circuit board in the normal direction to the extension plane of the circuit board. In other words, a volume position of the circuit board with respect to a further casing wall arranged perpendicular to the casing wall can be achieved. As a result, a centering of the vertical position of the circuit board can be achieved, for example.

A connection cover may be attached on an outer side of the casing wall, the cover comprising a cover opening corresponding to the opening, wherein the centering of the circuit board during the placing movement centers the connection means with respect to the cover opening. As a result, it is possible that the connection means can plunge into the connection cover in a targeted manner. For example, the connection cover is formed as a plastic cover and plugged on a side wall of the casing wall. The pre-centering enables that the connection means can plunge into the connection cover in a collision-free manner, wherein a narrow circumferential gap can be achieved between cover and connection means. Typically, narrow circumferential gaps are desired for reasons of design and a clearance-free mounting process. Moreover, narrow gaps contribute to a safe mechanical support of the connection means in the final mounting position of the circuit board. For example, the connection cover is plugged on the casing wall, for example, e.g., latched. The connection cover contributes to a modularity, wherein different covers can be used depending on the type of the connection means of the circuit board.

The connection cover may comprise the centering means. The centering means protrudes through a further opening in the casing wall, which is typically formed as a metal sheet, into the interior of the computer casing. For centering, the circuit board cooperates with the centering means of the connection cover as described above. This enables providing or not providing centering by the cover in a modular manner depending on the connection means.

The connection means may plunge through the opening and/or cover opening at least partially when continuing the placing movement. As a result, the connection means may terminate flush with an outer side of the casing wall or an outer side of the connection cover, when the circuit board is in the final mounting position. As a result, the connection means is reliably supported via the cover and/or the opening in the casing wall.

The connection means may be formed according to the USB C-standard. In other words, the connection means is formed according to the USB C-specification or standard in terms of its shape and dimensions. In contrast to known USB connection means, which would stop against an inner side of the casing wall, the USB C-standard plunges into the connection cover. The pre-centering is advantageous in particular for a connection means according to the USB C-standard.

I also provide a computer casing for an above-described computer system. The computer casing comprises a casing wall having an opening to pass through a connection means. Furthermore, the computer casing comprises a centering means arranged in the casing, which is formed such that a circuit board arranged in the casing is centered during a placing movement in the direction of the casing wall so that a connection means secured to the circuit board takes a position flush with the opening in the casing wall. As a result, the above-described advantages and functions are made possible.

The computer casing may comprise one or multiple of the configurations described with reference to the computer system.

Further advantages and functions are described in the following detailed description of an example. The example is described below using the attached FIGURE.

FIG. 1 shows a computer system 1 in a schematic perspective view. Computer system 1 is a compact-design mini PC, for example, which is characterized by small dimensions. The computer system 1 has a computer casing 2 formed from a metal material. The computer casing 2 has a casing wall 3 that represents a casing side of the computer system 1. Multiple openings 4a, 4b are introduced in the casing wall 3, via which connection means 5a and 5b of a circuit board 6 can be contacted inside the computer system or are accessible from outside the computer system 1.

A connection cover 7 is provided on the outer side of the computer system 1, the cover plugged on the casing wall 3 in a latched manner. In other words, the connection cover 7 is snapped-in on the casing wall 3.

The circuit board 6 is illustrated in the interior of the computer casing 2, which is not yet in its final mounting position. In the example, the circuit board 6 is a mainboard or motherboard of the computer system 1. The connection means 5a and 5b are arranged on the circuit board 6 in a fixed and direct manner. In this case, the connection means are plug connectors according to a USB standard, for example. Hereinafter, reference is made to the first connection means 5a, which is a plug connector according to the USB C-type specification.

In the illustrated state, the circuit board 6 is already inserted in the computer casing 2, wherein this board rests on the mounting bolts or mounting pins, for example. In the illustrated state, which can also be referred to as the first mounting state, the circuit board 6 is oriented parallel to an underlying casing wall (not shown). This underlying casing wall is oriented perpendicular to the shown casing wall 3, for example. In other words, the circuit board 6 is arranged parallel to a casing base.

To bring the circuit board 6 into the final mounting position, e.g., the second mounting state, the circuit board is displaced in the direction toward the casing wall 3 according to a placing movement 8. Thus, the circuit board 6 is displaced parallel to the casing base or parallel to its main extension plane. According to the configuration of the first connection means 5*b*, the latter plunges through the assigned first opening 4*a* of the casing wall 3 into a cover opening 9 of the connection cover 7 that corresponds thereto in the second mounting state and terminates flush with the connection cover 7. In terms of its shape, the cover opening 9 is almost exactly adapted to outer dimensions of the first connection means 5*a*, e.g., involving very little tolerances. As a result, a particularly narrow circumferential gap is formed between first connection means 5*a* and connection cover 7 in the region of the cover opening 9 in the final mounting position.

So that the first connection means 5*a* can plunge into the cover opening 9 in a collision-free and unobstructed manner despite the narrow tolerances, the connection cover 7 comprises a centering means 10 that cooperates with the circuit board 6 during the placing movement 8. The centering means 10 protrudes perpendicularly from the connection cover 7 through a correspondingly adapted further opening 11 into the casing wall 3 against the placing movement 8. The centering means 10 is configured as a guide pin or centering pin and has a cut-out 12.

The circuit board comprises a cut-out 13 for cooperation with the centering means 10 and the cut-out 12 thereof. The cut-out 12 of the centering means 10 is formed as a slot which extends essentially parallel to the main extension plane of the circuit board 6. The cut-out 12 of the centering means 10 is adapted to a thickness of the circuit board 6. The cut-out 13 is also formed in the type of a slot and adapted to a thickness or wall thickness of the centering means 10.

In the placing movement 8 of the circuit board 6 in the direction toward the casing wall 3, the cut-out 12 of the centering means 10 receives the circuit board 6 in a form-fit manner and the cut-out 13 of the circuit board 6 engages around the centering means 10 in a form-fit manner. As a result, the circuit board 6 is centered with respect to the casing wall 3 in two directions, e.g., in lateral and vertical positions, parallel to the casing wall 3. This effects a pre-centering of the first connection means 5*a* since the latter is fixed to the circuit board 6 in a fixed manner. As a result, the first connection means 5*a* is arranged exactly flush with these openings 4*a* and 9. When displacing the circuit board 6 further according to the placing movement 8 into the final position, the first connection means may thereupon plunge through the openings 4*a* and 9 in a secure manner.

The above-mentioned advantages are achieved by centering the circuit board 6. The circuit board 6 is directly and immediately centered while avoiding tolerances. As a result, in the placing movement the first connection means 5*a* is pre-centered and plunges into the cover opening 9 in a flush manner then. In addition, the centering enables that the above mentioned circumferential gap can be particularly narrow in the mounted state due to the especially small tolerance chain, e.g., between 0.3 to 0.5 mm.

The described centering is also suitable for other connection means that plunge into a corresponding opening in a casing wall and/or cover opening. Furthermore, it is also possible for more than one connection means to be pre-centered by the centering of a circuit board.

Although my systems and casings have been described in connection with specific forms thereof, it will be appreciated that a wide variety of equivalents may be substituted for the specified elements described herein without departing from the spirit and scope of this disclosure as described in the appended claims.

The invention claimed is:

1. A computer system comprising:
    a computer casing having a casing wall having a first opening to pass through a connection means and a second opening to pass through a guide pin having a U-shaped cut-out;
    a circuit board having at least one edge having the connection means mounted thereon; and
    the guide pin, separate from the connection means, arranged in the casing and configured to align the circuit board relative to the casing wall, wherein
    the at least one edge of the circuit board comprises a cut-out having a U-shape perpendicular to the cut-out of the guide, and
    wherein the cut-out of the guide pin is formed to directly engage with the cut-out of the circuit board such that the circuit board itself is centered with respect to the casing wall in a direction of the casing wall during a placing movement so that the connection means takes a predetermined position flush with respect to the opening in the casing wall and can plunge into the opening.

2. The computer system according to claim 1, wherein the cut-out of the guide pin engages with the circuit board for centering during the placing movement, wherein the cut-out of the guide pin is adapted to a thickness of the circuit board.

3. The computer system according to claim 1, wherein a connection cover is attached on an outer side of the casing wall and comprises a cover opening corresponding to the first opening, wherein the guide pin for the circuit board centers the connection means with respect to the cover opening during the placing movement.

4. The computer system according to claim 3, wherein the connection cover comprises the guide pin.

5. The computer system according to claim 3, wherein, after centering, the connection means at least partially plunges into the first opening and/or the cover opening when continuing the placing movement.

6. The computer system according to claim 1, wherein the connection means is formed according to the C-type USB-standard.

7. A computer casing for a computer system, comprising:
    a casing wall having a first opening to pass through a connection means and a second opening to pass through a guide pin having a U-shaped cut-out; and
    the guide pin, separate from the connection means, the guide pin arranged in the computer casing and formed to directly engage with a cut-out of a circuit board arranged in the casing such that the circuit board itself is aligned in a direction towards the casing wall during a placing movement so that the connection means secured on the circuit board takes a predetermined position flush with the opening in the casing wall, wherein the circuit board has at least one edge having the connection means mounted thereon, and the at least one edge of the circuit board comprises the cut-out having a U-shape perpendicular to the cut-out of the guide pin for engagement with the guide pin during the placing movement.

* * * * *